July 30, 1946.  R. J. PATTERSON  2,404,923
ISOMERIZATION OF BUTANE
Filed June 24, 1944
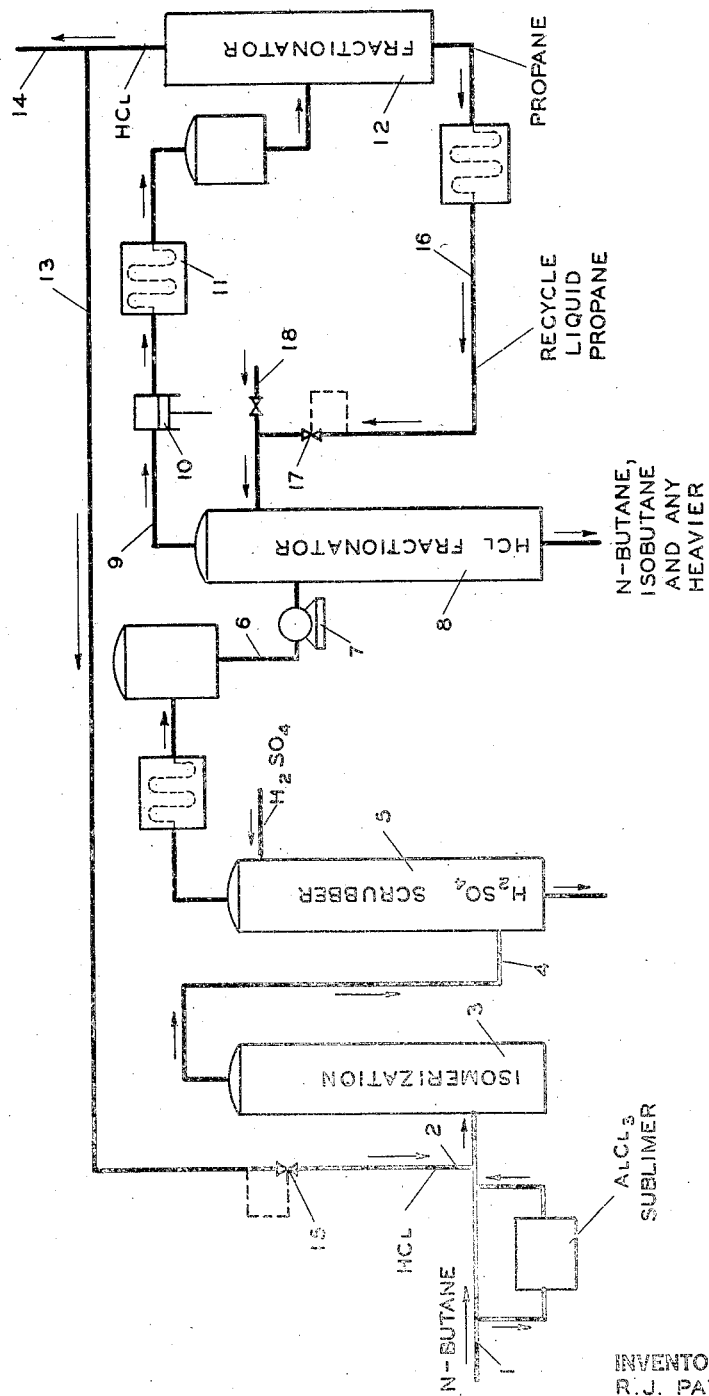
INVENTOR
R. J. PATTERSON
BY Hudson & Young
ATTORNEY Patented July 30, 1946

2,404,923

UNITED STATES PATENT OFFICE 2,404,923

ISOMERIZATION OF BUTANE

Robert J. Patterson, Bartlesville, Okla., assignor to Phillips Petroleum Company, a corporation of Delaware Application June 24, 1944, Serial No. 541,917

7 Claims. (Cl. 260—683.5)

This invention relates to the isomerization of butane and more particularly to recovery of recycle hydrogen chloride of higher purity than heretofore.

Conventional practice in the isomerization of normal butane to isobutane involves passing the vaporous butane in admixture with an appropriate amount of hydrogen chloride as a promoter through a bed of aluminum chloride supported on an absorbent carrier, preferably "Porocel," withdrawing the vaporous effluent, treating the same as by scrubbing with concentrated sulfuric acid to remove the volatilized aluminum chloride therefrom, and passing the aluminum chloride-free effluent into a unit for the separation of hydrogen chloride for recycle. The separation of hydrogen chloride is commonly effected by passing the vaporous effluent after liquefaction into a fractionating column operated as a stripper, the feed usually being introduced near or at the top of the column. In this column an overhead containing hydrogen chloride and lighter components and practically all of the propane together with substantial amounts of butanes is separated and recycled to the isomerization unit as a source of hydrogen chloride. The bottoms product containing the balance of the butanes and any heavier components usually also together with some propane, is passed to a system for the separation of normal butane and isobutane in substantially pure form for recycle and as product respectively. The standard method of operating is to operate the hydrogen chloride fractionator as a stripper so that careful fractionation with a large number of plates and under close control is not necessary.

Conventional practice as outlined above is not entirely satisfactory since the separation effected in the hydrogen chloride fractionator is not clean. Substantial amounts of isobutane and normal butane are present in the recycle hydrogen chloride stream. Objectionable amounts of propane are also present in the recycle hydrogen chloride stream and consequently the recycle stream is not desirably high in hydrogen chloride. These objections are particularly disadvantageous where it is being attempted to operate the isomerization process at high hydrogen chloride levels, say over 10 mol per cent and occasionally as high as 30 mol per cent of hydrogen chloride in the reaction zone.

The principal object of the present invention is to provide an improved process for the isomerization of normal butane to isobutane. Another object is to provide a process which enables the recovery of a more pure hydrogen chloride recycle stream in a simple and economical manner. Another object is to avoid the reduction in yield attributable to the presence of isobutane in the hydrogen chloride recycle stream. Numerous other objects will more fully hereinafter appear.

The accompanying drawing portrays diagrammatically an arrangement of equipment suitable for carrying out the present invention.

The present invention is directed to an improvement in the process of isomerizing butane which involves passing the vaporous normal butane in admixture with hydrogen chloride as a promoter into contact with aluminum chloride as a catalyst under conditions such that isomerization of normal butane to isobutane is the principal reaction, withdrawing the vaporous reaction effluent and passing it to a hydrogen chloride fractional distillation zone and there separating it into a vaporous overhead containing propane, hydrogen chloride and lighter components and a bottoms fraction containing butanes and any heavier components. The improvement of the present invention involves liquefying the vaporous overhead from the hydrogen chloride fractional distillation zone, passing the resulting liquid into a second fractional distillation zone and there fractionally distilling it to separate it into a vaporous overhead containing the hydrogen chloride and lighter components and substantially free from propane and a bottom fraction containing substantially all of the propane and substantially free from hydrogen chloride. The overhead from this second fractional distillation zone is employed as recycle hydrogen chloride, this stream being much richer in hydrogen chloride as a result of the fractionating referred to. The bottoms from the second fractionation which is chiefly or substantially propane is recycled to the hydrogen chloride fractional distillation zone as reflux therefor.

In the preferred practice of the present invention the hydrogen chloride fractionator is operated as a stripper thereby simplifying the separation and allowing the stripper to be easily controlled, all of the hydrogen chloride and propane and some butanes going overhead as a result of the rough separation. In this preferred embodiment this gaseous overhead is liquefied by compression and cooling and the resulting liquid is fractionated at the resulting pressure in the second fractional distillation zone. When the hydrogen chloride fractionator is operated as a stripper in this manner, it is necessary to compress the stripper overhead to at least 400 pounds per square inch and to cool it to not over 100° F. in order to effect liquefaction and prepare it for feeding to the second fractional distillation. The second fractional distillation is conducted at the same elevated pressure. It is necessary to lower the pressure on the recycle hydrogen chloride stream to that prevailing in the isomerization converter and likewise to lower the pressure on the propane bottoms to the pressure prevailing in the hydrogen chloride stripper before employing the liquid propane bottoms from the second fractional distillation zone as reflux in the hydrogen chloride stripper. In a typical embodiment the gaseous overhead from the hydrogen chloride stripper is compressed to 500 pounds per square inch and cooled to not over 100° F.

By the introduction of liquid propane into the top of the hydrogen chloride fractionator in accordance with the present invention the hydrogen chloride is removed overhead with propane vapors and butanes are prevented from going overhead and are recovered in the kettle product. The incoming isomerization effluent composed of normal butane, isobutane, hydrogen chloride and some propane and lighter components either in vaporous or more usually in liquid form contacts the liquid propane introduced at the top as reflux resulting in the vaporization of propane and condensation of butanes. The cooling effect of the liquid propane may be further accentuated by reducing the pressure of the liquid propane bottoms from the second fractionator and expanding the liquid propane into the top of the hydrogen chloride fractionator in direct heat exchange and admixture with the materials therein.

Propane is formed in small amounts in the isomerization of normal butane to isobutane with hydrogen chloride and aluminum chloride. Usually the amount of propane formed ranges from 1 to 2 mol per cent of the isomerization effluent. Since my process effects continuous recycling of the propane derived from the hydrogen chloride fractionator overhead, once the process is in operation it is not necessary to introduce any propane from an outside source, the propane formed in the isomerization step being more than sufficient to make up for any system losses. Any excess of propane will go out in the bottom product of the hydrogen chloride fractionator and will be removed in subsequent processing steps. In addition to the propane formed in the isomerization reaction unit itself by side reactions, a small amount of propane is usually introduced with the normal butane feed and is available together with the propane formed in the reaction for the practice of the present invention.

In the drawing fresh normal butane feed after admixture with a suitable amount of hydrogen chloride recycle flowing in line 2 passes via line 1 into isomerization reactor 3 where the conversion takes place in a conventional manner. The vaporous isomerization effluent passes via line 4 through sulfuric acid scrubber 5 where it is scrubbed in known manner with concentrated sulfuric acid to remove traces of aluminum chloride. The resulting scrubbed vapors after cooling pass via line 6 and pump 7 into hydrogen chloride fractionator 8 which is generally operated as a hydrogen chloride stripper in which case the feed enters at a point near the top of the column. The overhead vapors from column 8 pass via line 9 to compressor 10 and cooler 11 which serve to liquefy them. The resulting liquid is passed at the temperature and pressure imparted to it by compressor 10 and cooler 11 into fractionator 12 where separation is effected between the hydrogen chloride and propane. The components lighter than hydrogen chloride go overhead therewith. Any components heavier than propane appear in the bottoms with the propane. The overhead fraction is recycled to the isomerization unit via line 13. Any excess, usually chiefly derived from the conversion of aluminum chloride to hydrogen chloride in scrubber 5, may be withdrawn from the system via line 14. Pressure reducing valve 15 is interposed in recycle line 13 for the purpose of reducing the pressure on the recycle stream from the high pressure maintained in column 12 to the relatively low pressure maintained in isomerization unit 3.

The liquid propane bottoms from column 12 is recycled via line 16 and pressure reducing valve 17 into the top of HCl stripper 8 and serves as reflux therefor. Desirably this liquid propane is reduced in pressure and expanded directly into the top of column 8 thereby increasing the cooling effect and increasing the extent of separation between butanes and lighter in column 8. If desired, for purposes of starting up or to make up any system losses, liquid propane from an extraneous source may be introduced via line 18 as reflux for column 8.

The present invention has many advantages over prior practice. Principal among them is that the hydrogen chloride recycle stream is kept much lower in propane content. Another advantage is that presence of butanes in the recycle stream is completely prevented. The invention is especially advantageous over the use of a single precision high pressure hydrogen chloride fractionator since in the present invention high pressure fractionation is restricted to the overhead only, fractionator 8 commonly being operated at the conventional stripping pressure and with the conventional degree of control. The injection of liquid propane into the top of stripper 8 serves to markedly cut down the amount of butanes going overhead in line 9. The present invention is particularly useful in isomerization processes where the hydrogen chloride concentration in the reaction zone runs as high as 25 to 30 mol per cent. Numerous other advantages of the present invention will be apparent to those skilled in the art.

*Example*

Normal butane was isomerized to isobutane in the conventional manner using vapor phase conversion and a catalyst bed of "Porocel" impregnated with aluminum chloride and the usual amount of hydrogen chloride in the feed, the pressure being 205–220 p. s. i. and the temperature at the start being 240° F. and being gradually raised to 300° F. as the converter remains onstream in order to maintain conversion. The vaporous effluent after being scrubbed with concentrated sulfuric acid to remove AlCl₃ was cooled to effect liquefaction and pumped into a hydrogen chloride stripper operated at a pressure of about 50 pounds above the pressure in the isomerization chamber and sulfuric acid scrubber and with a bottom temperature of 230° F. The stripper overhead had the following composition, the figures being to the nearest one per cent:

| | Mol per cent |
|---|---|
| Hydrogen | 9 |
| Methane | 6 |
| Ethane | 8 |
| Hydrogen chloride | 46 |
| Propane | 30 |
| Butanes | 1 |

This overhead fraction was compressed to a pressure of 500 p. s. i. and cooled to 70° F. and the resulting liquid was passed to a fractionator having 40 trays and operated at 500 p. s. i. and with a top temperature of 55° F. The overhead from this fractionator analyzed as follows:

| | Mol per cent |
|---|---|
| Hydrogen | 13 |
| Methane | 9 |
| Ethane | 12 |
| Hydrogen chloride | 65 |
| Propane | 1 |

The bottoms product had the following analysis:

| | Mol per cent |
|---|---|
| Ethane and lighter | 0 |
| Hydrogen chloride | 2 |
| Propane | 95 |
| Butanes | 3 |

The bottoms product was reduced in pressure to the pressure of the hydrogen chloride stripper and injected into the top thereof as liquid reflux.

In carrying out the present invention the isomerization is usually conducted at pressures ranging from 200 to 250 pounds per square inch gage. The hydrogen chloride stripper is operated at pressures ranging from 15 to 50 pounds above the pressure prevailing in the isomerization chamber or at pressures ranging from 215 to 300 pounds per square inch gage. The second fractionation step performed in fractionator 12 is carried out at pressures ranging from 400 to 600 pounds per square inch.

I claim:

1. In the process of isomerizing a butane to an isomeric butane by passing a butane in admixture with hydrogen chloride as a promoter into contact with aluminum chloride as a catalyst under conditions such that isomerization of butane to an isomeric butane is the principal reaction, and withdrawing a vaporous effluent, the improvement which comprises cooling and condensing said vaporous effluent, passing a resulting condensate to a hydrogen chloride fractional distillation zone and there separating it into a vaporous overhead containing propane, hydrogen chloride and lighter components and a bottom fraction containing butanes and any heavier components, liquefying said overhead, passing the resulting liquid into a fractional distillation zone and there fractionally distilling it to separate it into a vaporous overhead containing the hydrogen chloride and lighter components and substantially free from propane and a bottom fraction containing substantially all of the propane and substantially free from hydrogen chloride, recycling said last-named overhead to the isomerization step as a source of hydrogen chloride promoter, and recycling said last-named bottom fraction to the top of said hydrogen chloride fractional distillation zone and employing same as liquid reflux therefor.

2. In the process of isomerizing a butane to an isomeric butane by passing a butane in admixture with hydrogen chloride as a promoter into contact with aluminum chloride as a catalyst under conditions such that isomerization of a butane to an isomeric butane is the principal reaction, some propane being formed by side reaction, and withdrawing a vaporous effluent, the improvement which comprises cooling and condensing said vaporous effluent, passing a resulting condensate to a hydrogen chloride stripper and there stripping a vaporous overhead fraction containing propane, hydrogen chloride and lighter components from a bottom fraction containing butanes and any heavier components, liquefying said overhead by compressing and cooling, passing the resulting liquid at the resulting pressure and temperature into a fractional distillation zone and there fractionally distilling it to separate it into a vaporous overhead containing the hydrogen chloride and lighter components and substantially free from propane and a bottom fraction containing substantially all of the propane and substantially free from hydrogen chloride, recycling said last-named overhead to the isomerization step as a source of hydrogen chloride promoter, and recycling said last-named bottom fraction to the top of said hydrogen chloride stripper and employing same as liquid reflux therefor.

3. In the process of isomerizing normal butane to isobutane by passing a normal butane in admixture with hydrogen chloride as a promoter into contact with aluminum chloride as a catalyst under conditions such that isomerization of normal butane to isobutane is the principal reaction, some propane being formed by side reaction, and withdrawing a vaporous effluent, the improvement which comprises cooling and condensing said vaporous effluent, passing a resulting condensate to a hydrogen chloride stripper and there stripping a vaporous overhead fraction containing propane, hydrogen chloride and lighter components from a bottom fraction containing butanes and any heavier components, liquefying said overhead by compressing to at least 400 pounds per square inch gage and cooling to not over 100° F., passing a resulting liquid at the resulting pressure and temperature into a fractional distillation zone and there fractionally distilling it to separate it into a vaporous overhead containing hydrogen chloride and lighter components and substantially free from propane and a bottom fraction containing substantially all of the propane and substantially free from hydrogen chloride, recycling said last-named overhead to the isomerization step after reducing the pressure thereof to the pressure prevailing in the isomerization step, and recycling said last-named bottom fraction to the top of said hydrogen chloride stripper after lowering the pressure thereof to the pressure prevailing in said hydrogen chloride stripper and employing same as liquid reflux therefor.

4. In the process of isomerizing normal butane to isobutane by passing the normal butane in admixture with hydrogen chloride as a promoter into contact with aluminum chloride as a catalyst under conditions such that isomerization of normal butane to isobutane is the principal reaction, some propane being formed by side reaction, and withdrawing a vaporous effluent, the improvement which comprises cooling and condensing said vaporous effluent, passing a resulting condensate to a hydrogen chloride stripper and there stripping a vaporous overhead fraction containing propane, hydrogen chloride and lighter components from a bottom fraction containing butanes and any heavier components, liquefying said overhead by compressing to at least 500 pounds per square inch gage and cooling to not over 100° F., passing the resulting liquid at the resulting pressure and temperature into a fractional distillation zone and there fractionally distilling it to separate it into a vaporous overhead containing the hydrogen chloride and lighter components and substantially free from propane and a bottom fraction containing substantially all of the propane and substantially free from hydrogen chloride, recycling said last-named overhead to the isomerization step after lowering the pressure thereof to the pressure prevailing in the isomerization step, and recycling said last-named bottom fraction to the top of said hydrogen chloride stripper after lowering the pressure thereof to the pressure prevailing in the said hydrogen chloride stripper and employing same as liquid reflux therefor.

5. In the process of isomerizing normal butane to isobutane by passing the normal butane in admixture with hydrogen chloride as a promoter into contact with aluminum chloride as a catalyst under conditions such that isomerization of normal butane to isobutane is the principal reaction, some propane being formed by side reaction, and withdrawing a vaporous effluent, the improvement which comprises cooling and condensing said vaporous effluent, passing a resulting condensate to a hydrogen chloride stripper operated at a pressure of from 215 to 300 pounds per square inch gage and there stripping a vaporous overhead fraction containing propane, hydrogen chloride and lighter components from a bottom fraction containing butanes and any heavier components, liquefying said overhead by compressing to at least 400 pounds per square inch gage and cooling to not over 100° F., passing the resulting liquid at the resulting pressure and temperature into a fractional distillation zone and there fractionally distilling it to separate it into a vaporous overhead containing the hydrogen chloride and lighter components and substantially free from propane and a bottom fraction containing substantially all of the propane and substantially free from hydrogen chloride, recycling said last-named overhead to the isomerization step as a source of hydrogen chloride promoter, lowering the pressure on said last-named bottom fraction to that prevailing in said hydrogen chloride stripper and expanding same in direct heat exchange into the top of said stripper and employing same to provide reflux for said stripper.

6. The method of separating hydrogen chloride from admixture with hydrocarbons comprising butanes and propane, which comprises passing said mixture to a hydrogen chloride stripper operated at a pressure of from 215 to 300 pounds per square inch gage and there stripping a vaporous overhead fraction containing propane, hydrogen chloride and lighter components from a bottom fraction containing butanes and any heavier components, liquefying said overhead by compressing to at least 400 pounds per square inch gage and cooling to not over 100° F., passing the resulting liquid at the resulting pressure and temperature into a fractional distillation zone and there fractionally distilling it to separate it into a vaporous overhead containing the hydrogen chloride and lighter components and substantially free from propane and a bottom fraction containing substantially all of the propane and substantially free from hydrogen chloride, lowering the pressure on said last-named bottom fraction to that prevailing in said hydrogen chloride stripper and expanding same in direct heat exchange into the top of said stripper and employing same to provide reflux for said stripper.

7. The method of separating hydrogen chloride from admixture with hydrocarbons comprising butanes and propane, which comprises passing said mixture to a hydrogen chloride fractional distillation zone and there separating it into a vaporous overhead containing propane, hydrogen chloride and lighter components and a bottom fraction containing butanes and any heavier components, liquefying said overhead, passing the resulting liquid into a fractional distillation zone and there fractionally distilling it to separate it into a vaporous overhead containing the hydrogen chloride and lighter components and substantially free from propane and a bottom fraction containing substantially all of the propane and substantially free from hydrogen chloride, and recycling said last-named bottom fraction to the top of said hydrogen chloride fractional distillation zone and employing same as liquid reflux therefor.

ROBERT J. PATTERSON.